Nov. 20, 1962  F. A. DOBSON  3,064,317
DOUBLE WALL CONSTRUCTION
Filed May 12, 1959  2 Sheets-Sheet 1

INVENTOR.
FRANKLIN A. DOBSON
BY Noel D Conway
ATTORNEY

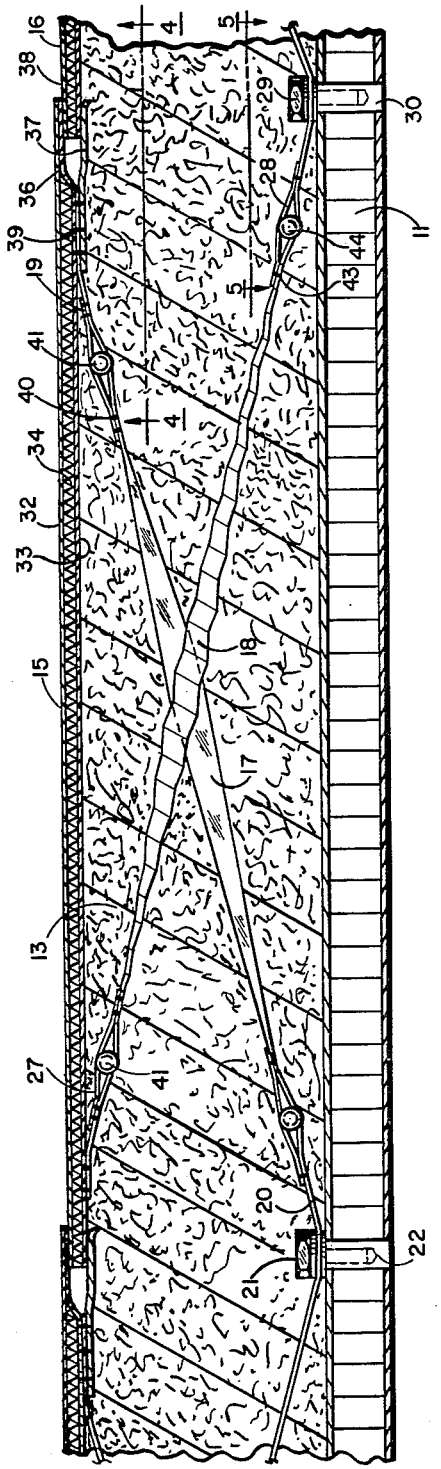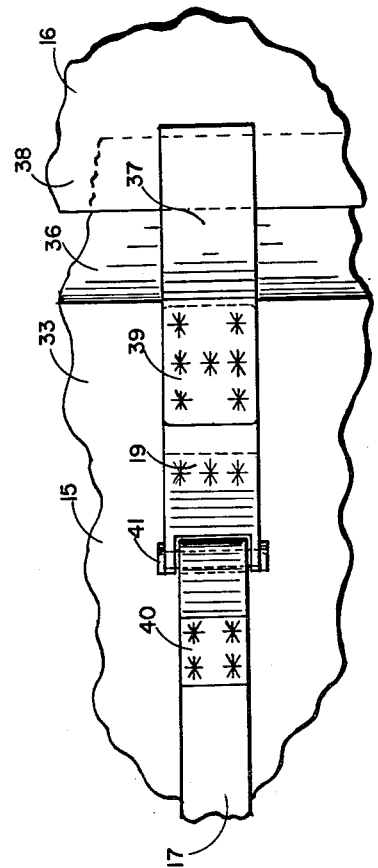

United States Patent Office 3,064,317
Patented Nov. 20, 1962

3,064,317
DOUBLE WALL CONSTRUCTION
Franklin A. Dobson, Whittier, Calif., assignor to
North American Aviation, Inc.
Filed May 12, 1959, Ser. No. 812,701
7 Claims. (Cl. 20—4)

This invention relates generally to wall structures and more particularly to a double wall structure for use with high velocity air vehicles.

This invention relates more specifically to a double wall structure which provides only relatively small paths for heat to travel from the outer wall to the inner wall of the structure.

This invention further relates to a double wall structure wherein the outer wall may expand when heated without inducing stresses into the inner wall structure which carries the structural loads of the air vehicle.

Many modern aircraft must be capable of traveling at very high velocities which has led to the requirement for new structures for constructing such airborne vehicles. One main problem encountered is that the surface of the aircraft, exposed to the outside air through which the aircraft is flying, becomes very hot due to the heat generated by friction with the air which causes the surface material to expand while the inside of the air vehicle remains at a more constant temperature, whereby the interior structure does not expand as much. Therefore, any structure used to construct the outside wall or skin of the aircraft must not only have sufficient rigidity to withstand the buffeting of the air but it must be able to expand relative to the inner structure of the air vehicle as the external temperatures increase. A further problem in such high velocity vehicles is that means must be provided to prevent the heat generated in the outer surface of the vehicle from being transmitted into the interior of the vehicle since it is desired to maintain the interior of the vehicle at a relatively constant temperature. Prior double wall constructions which have been suggested are unsuitable for use with very high speed air vehicles because they do not meet the above requirements.

With these requirements in mind it is therefore an object of this invention to provide a double wall structure.

It is a further object of this invention to provide a double wall structure which will allow the outer wall to expand when exposed to high heat due to air friction without inducing stresses into the inner wall.

An additional object of this invention is to provide a double wall structure which has a minimum of heat paths between the outer wall and the inner wall.

Other and further objects of this invention will become apparent in the detailed description below wherein:

FIG. 3 is a partial cross section along the longitudinal axis of the air vehicle showing the construction of the present double wall in greater detail;

FIG. 4 is a detailed partial view showing the manner in which the tension members are mounted to the outer wall; and, FIG. 5 is a detailed partial view showing the manner in which the tension members are mounted to the inner wall.

Figure 1:
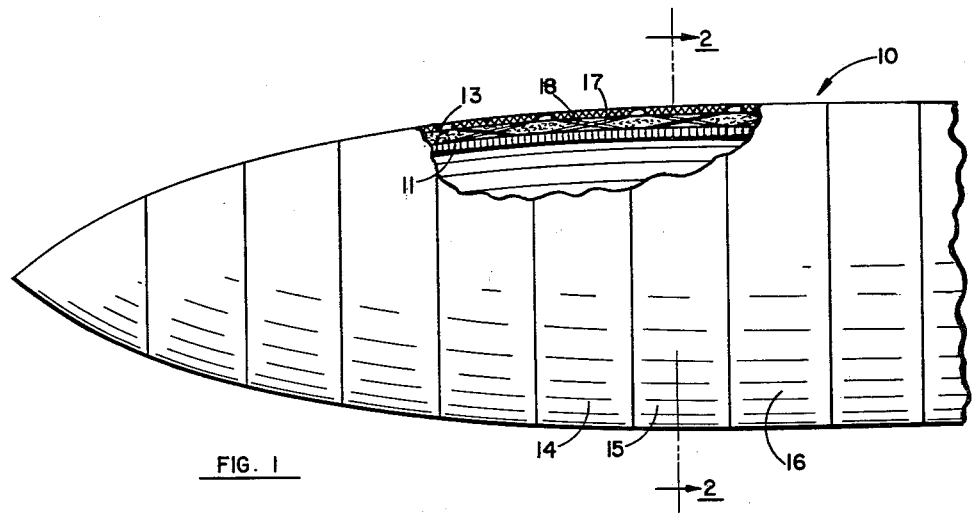
FIG. 1 is a partial cutaway view of an air vehicle incorporating the present invention.

Referring now to FIG. 1, which shows an air vehicle 10 such as a missile incorporating the present double wall construction, it is seen that the missile has an inner structural wall 11 which is designed to carry the structural loads incurred by the missile. In the present embodiment, the structural wall 11 is manufactured of brazed honeycomb core sandwich structure which has a high strength to weight ratio such as the honeycomb core sandwich material disclosed in Patent No. 2,608,500. Surrounding wall 11 is a layer of resilient insulation 13 which in turn is surrounded by the outer wall which is made up of a series of outer wall panels which abut each other in sliding engagement, of which panels 14, 15, and 16 are numbered. Each of these panels is preferably made of a corrugated sandwich material as described in Patent No. 2,747,064.

Figure 2:
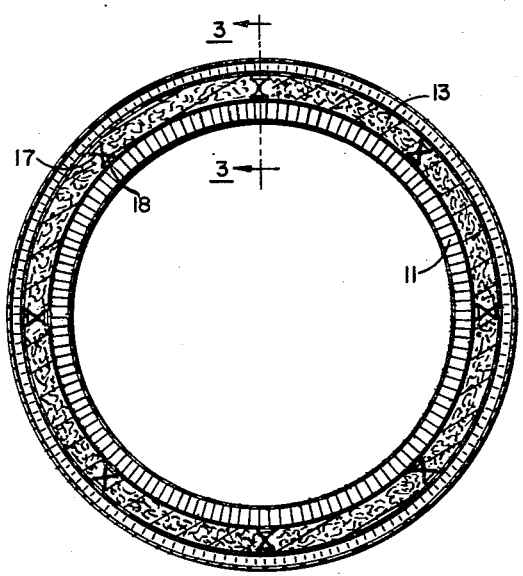
FIG. 2 is a cross sectional view of the air vehicle as seen along the line 2—2.

The present double wall construction may cover all or part of the outer surfaces of the missile, however, in the present embodiment of the invention, the double wall structure extends around the entire periphery of the missile at a right angle to the longitudinal axis of the missile as shown in FIG. 2. With this embodiment, the interior of the air vehicle is protected from heat of air friction on all sides of the air vehicle. As can be seen each of the outer wall panels forms a circumferential band which is located concentric to the inner wall 11 in spaced relation to the inner wall. A series of thin tension members 17 and 18 located at different positions around each panel cooperate with insulation 13 to maintain the outer wall panels in the concentric relation.

FIG. 3 is a partial cross sectional view of the present double wall construction showing one of the series of tension members 17 which is mounted to the panel 15 by means of a mounting member 19 and extends forwardly and inwardly to a position where it is mounted to the inner wall 11 by means of a mounting member 20 which is mounted to wall 11 by means of a bolt 21 threaded into an insert 22. The series of tension members 17 prevent the particular outer panel from being moved rearwardly by the frictional forces of the air stream, and the acceleration forces on the missile 10. Preferably, the tension members are made of a stainless steel strip 0.003 inch thick and one half inch wide, which has been found to work satisfactorily and allows the present structure to be assembled easily. The thickness of the members may vary according to the particular application; however, each should be at least 0.002 inch and not more than 0.010 inch thick. If the member is less thick, then it is too hard to handle. If the member thickness exceeds the above mentioned upper limit, heavier apparatus is required to weld it which can not be easily located in the various positions between the inner wall and outer wall panels as necessary. The width of the member 17 may be varied in accordance to the particular thickness provided in order to keep the cross section area of the member relatively constant; however, the width of the member 17 should be at least one quarter inch to avoid undue handling problems. Also shown is one of the series of opposing tension members 18 which is mounted to the outer wall panel 15 by means of a mounting member 27 and extends inwardly and rearwardly to a point where the tension member 18 is mounted to the inner wall 11 by means of a mounting member 28 which is mounted to the inner wall by means of a bolt 29 threaded into an insert 30. These tension members 18 are preferably of the same dimensions as the strips 17 or smaller, since they only have to prevent the respective outer wall panels from moving forwardly if the missile were decelerated. It should be noted that tension member 18 is slightly corrugated laterally. This is done in order to provide resiliency in order that the respective outer wall panel to which it is mounted may expand without inducing very high stresses in the tension member. The rest of each series of tension members are substantially the same and therefore do not require individual discussion.

The primary function of the series of tension members 17 and 18 is to prevent the outer wall panel 15 from moving in a forwardly or rearwardly direction, and therefore each of the tension members extend from the inner surface of the panel 15 at a relatively small angle, preferably 5° to 35°, in a plane which is at a right angle to the direction in which the respective outer panel extends at that portion and substantially parallel to the longitudinal axis of the missile. In other situations it may be desirable that the tension members extend in some other plane. For example, when it is desired to better prevent lateral rotational movement of a particular panel with respect to the inner structural wall 11, half of the tension members are mounted so that they extend forwardly and rightwardly at an angle of 15° to 35° to the longitudinal axis of the missile while the other half are mounted so that they extend forwardly and leftwardly at an equal angle.

In the present embodiment the structure by which each of the outer panels abut the adjacent panel in sliding engagement is substantially the same; therefore, only structure at the adjacent edges of panels 14, 15 and 16 along line 3—3 is disclosed in detail. As mentioned above the outer wall panels are preferably made of the corrugated core structure manufactured in accordance with Patent No. 2,747,064 which is economical to produce and has a highly desirable strength to weight ratio. On panel 15 the outer face sheet, inner face sheet, and core are designated as 32, 33 and 34 respectively. Since this material is more rigid in the direction parallel to the convolutions of the corrugations the outer panels are constructed with the convolutions extending the circumferential length of the bands around the missile laterally of the longitudinal axis of the missile. Such orientation makes the outer panels more rigid in order that they may withstand the buffeting of the airstream better. Referring now to the adjacent edges of panels 15 and 16 in order to describe the manner in which each of the outer wall panels slidably engage each other, it can be seen that the inner face sheet 33 is deformed outwardly to abut the outer face sheet 32 at rearward edge portion 36 and thereby forms a relieved portion. A series of edge engaging projecting tongue members 37 are mounted to the panel 15 spaced around the rearward edge 36 of the panel and provide, with the rearward edge 36, means forming a recess which receives forward edge portion 38 of panel 16. The tongue members 37 are relatively rigid with only enough resilience so that forward edge portion 38 may be moved into the recess and will be continually urged by members 37 against the rearward edge portion 36 to form a relatively tight sliding junction between these portions. With each of the outer panels held together in this manner, the outer panels form an integral unit which is stiff enough to withstand any local loads due to the buffeting of the airstream.

The details of the manner in which the various tension members are mounted to the outer wall panel members are shown in FIG. 4 which discloses a detailed view of the manner in which one of the tension members 17 is mounted to panel 15. As can be seen the mounting member 19 and the edge engaging tongue member 37 are spot welded to the inner face sheet 33 of panel 15 by means of a series of spot welds 39. Tension member 17 is folded back to form a loop at the end thereof and is held by spot welds 40. The tension member 17 is joined to mounting member 19 by means of a ceramic pin 41 extending through these members which limits heat transfer from the mounting member to the tension member.

Figure 5:
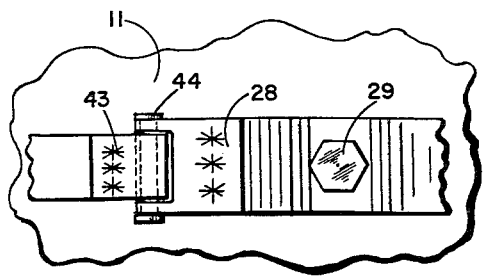

In order to illustrate the manner in which each of the tension members is mounted to the inner wall 11 a detailed view of the manner in which tension member 18 is mounted to the inner wall 11 is shown in FIG. 5. As shown, tension member 18 is looped and spot welded at spot weld 43 and receives a ceramic pin 44 which extends through loops provided in mounting member 28.

In operation, the opposing orientation of the tension members prevent the outer wall panels from moving forwardly or rearwardly relative to the inner wall 11. Further, due to the fact that each of the tension members extend inwardly as well as forwardly or rearwardly these tension members hold the outer wall panels against the insulation 13. During high speed flight when the temperature of the outer wall panel is increased due to air friction the individual wall panels may expand due to the sliding engagement between each of the panels. This expansion will cause the tension members 18 to expand; however, since they are thin members and are slightly corrugated, excessive loads will not be built up in the inner wall 11 or the outer wall panel. The present structure has the further advantages that the tension members are very thin and therefore the limited amount of heat, which may get past the ceramic pin will be further limited by the very small cross section for heat transfer. Further, any heat traveling down the tension members must travel a further distance than the lateral distance between the inner and outer walls due to the fact that the tension members extend at a relatively small angle to the inner surface of the outer wall. Therefore, although metal, of which the tension members are fabricated, is a good heat conductor, the amount of heat conducted is limited by these structural characteristics. Thereby, the problems of insulating the air vehicle are solved by this arrangement in a relatively simple and effective manner.

While one embodiment of the present invention is shown and described in detail, it will be apparent to those in the art that various changes may be made to the structure without departing from the spirit of the invention which should be limited only to the scope of the appended claims.

I claim:

1. A double wall construction comprising: an inner structural wall having sufficient strength to carry structural loads; an outer wall spaced outwardly from said inner wall; a series of thin and relatively narrow corrugated tension members secured to said outer and inner walls and extending from said outer wall rearwardly and inwardly to said inner wall, and a solid insulation mounted between and engaging said inner and outer walls, said tension members preventing said outer wall from moving in a forward direction with respect to said inner wall.

2. An aircraft double wall construction comprising: an inner structural wall having sufficient strength to carry structural loads enclosing a compartment; means forming an outer wall spaced outwardly from said inner wall; said means including a plurality of outer wall panels abutting each other in sliding engagement; a first series of thin tension members secured to and extending from each of said outer wall panels rearwardly and inwardly to said inner wall, a second series of thin tension members secured to and extending from each of said outer wall panels forwardly and inwardly to said inner wall and so positioned to cross said first tension members, said tension members preventing said outer wall panels from moving rearwardly, forwardly, and outwardly away from said inner wall; a solid insulation mounted between and engaging said inner and outer walls.

3. An aircraft double wall construction comprising: an inner structural wall; a series of outer wall panels spaced from said inner wall; one edge portion of each of said outer wall panels overlapping the edge portion of the outer wall panel adjacent it whereby said panels form a continuous outer wall but may expand relative to each other; insulation means located in and substantially filling the space between the inner and outer walls; a series of thin tension members mounted to each of said outer wall panels and extending forwardly and inwardly to the inner wall where each tension member is mounted; and a series of opposing thin tension members mounted to each of said outer wall panels and extending rearwardly and inwardly to the inner wall where each tension member is mounted to the inner wall, said last mentioned members crossing said first mentioned members and being formed with a plurality of lateral corrugations whereby the last mentioned tension members may be extended slightly when the particular panel expands.

4. A double wall construction for an aircraft having a longitudinal axis comprising: an inner structural wall; means forming a continuous outer wall, said means including a series of abutting outer wall panels spaced from said inner wall, each of said outer wall panels including an inner face sheet and an outer face sheet mounted together in spaced relation by a corrugated core, the convolutions of the corrugation extending substantially at a right angle to the longitudinal axis of the aircraft, one edge portion of each of said outer wall panels overlapping the edge portion of the outer wall panel adjacent it whereby said panels may expand relative to each other; insulation means located in and substantially filling the space between the inner and outer walls; a series of first thin tension members mounted to each of said outer wall panels and extending forwardly and inwardly to the inner wall where each tension member is mounted; a series of second thin tension members mounted to each of said outer wall panels and extending rearwardly and inwardly to the inner wall where each tension member is mounted to the inner wall, said first thin tension members so positioned to cross said second thin tension members and each of said tension members lying in a plane which is parallel to the longitudinal axis of the aircraft.

5. A double wall insulative type structure comprising: an inner wall; an outer wall spaced outwardly from said inner wall; a first tension member extending rearwardly and outwardly from said inner wall to said outer wall; a second tension member operatively connecting said inner and outer walls; said second tension member extending forwardly and outwardly from said inner wall to said outer wall, said first tension member operative to restrain said inner wall from moving forward relative to said outer wall, and said second tension member operative to restrain said inner wall from moving rearward relative to said outer wall; said first and second tension members so positioned so as to cross each other, thus providing for a portion of said first tension member to be superimposed on a porion of said second tension member.

6. The invention of claim 5 further comprising: solid insulative means mounted between said inner and outer walls.

7. An aircraft double wall construction comprising: a compartment enclosing inner structural wall having sufficient strength to carry structural loads; means forming an outer wall spaced outwardly from said inner wall; said means including a plurality of outer wall panels abutting each other in sliding engagement; a first series of thin tension members secured to and extending from each of said outer wall panels in a first direction and secured to said inner wall; a second series of thin tension members secured to and extending from each of said outer wall panels in a second direction which is opposite to said first direction and secured to said inner wall and so positioned to cross said first tension members, said tension members preventing said outer wall panels from moving in said first and second directions and away from said inner wall.

References Cited in the file of this patent

UNITED STATES PATENTS

| | | |
|---|---|---|
| 1,605,513 | Connery | Nov. 2, 1926 |
| 1,972,005 | Berbeck | Aug. 28, 1934 |
| 2,101,270 | Rice | Dec. 7, 1937 |
| 2,104,144 | Zand | Jan. 4, 1938 |
| 2,420,292 | Baer et al. | May 13, 1947 |
| 2,440,306 | Smith | Apr. 27, 1948 |
| 2,451,146 | Baker et al. | Oct. 12, 1948 |
| 2,714,516 | Brown | Aug. 2, 1955 |
| 2,814,410 | Hansen | Nov. 26, 1957 |
| 2,817,484 | Stenzel | Dec. 24, 1957 |

FOREIGN PATENTS

| | | |
|---|---|---|
| 577,154 | Great Britain | May 7, 1946 |